United States Patent
Nakamura et al.

(10) Patent No.: US 8,279,961 B2
(45) Date of Patent: Oct. 2, 2012

(54) MIMO DEMODULATOR AND METHOD FOR THE SAME

(75) Inventors: Takatoshi Nakamura, Kawasaki (JP); Katsuhiro Ikeda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 802 days.

(21) Appl. No.: 12/357,206

(22) Filed: Jan. 21, 2009

(65) Prior Publication Data

US 2009/0129498 A1     May 21, 2009

Related U.S. Application Data

(63) Continuation of application No. PCT/JP2006/314424, filed on Jul. 20, 2006.

(51) Int. Cl.
   *H04K 1/10* (2006.01)
(52) U.S. Cl. ....................................................... 375/267
(58) Field of Classification Search ................... 375/260, 375/262, 265, 267; 455/24, 500, 69
See application file for complete search history.

(56) References Cited

U.S. PATENT DOCUMENTS

| | | | |
|---|---|---|---|
| 6,865,175 B1 | 3/2005 | Ritter | |
| 2003/0012308 A1* | 1/2003 | Sampath et al. | 375/340 |

FOREIGN PATENT DOCUMENTS

| | | |
|---|---|---|
| JP | 2001189768 | 7/2001 |
| JP | 2001522166 | 11/2001 |
| JP | 2003198426 | 7/2003 |
| JP | 2003332955 | 11/2003 |

OTHER PUBLICATIONS

International Search Report based on PCT/JP2006/314424 dated Aug. 22, 2006.

* cited by examiner

*Primary Examiner* — Young T. Tse
(74) *Attorney, Agent, or Firm* — Murphy & King, P.C.

(57) ABSTRACT

Channel estimates calculated by a channel estimator (32) are linearly interpolated (34). When transmissions from transmitting antennas are stopped due to a deterioration of the propagation environment, since a larger amount of computing resources become available for use, a channel estimate selector 36 selects the linearly interpolated channel estimates and supplies them to an MIMO demultiplexer 38 which can thus cope with fast fading.

5 Claims, 5 Drawing Sheets

MIMO DEMODULATOR AND METHOD FOR THE SAME

CROSS-REFERENCE TO RELATED APPLICATIONS

This is a continuation of International Application PCT/JP2006/314424, published in Japanese, with an international filing date of Jul. 20, 2006.

TECHNICAL FIELD

The present invention relates to an MIMO demodulator and MIMO demodulation method for performing channel demultiplexing of received data in an MIMO (Multiple Input Multiple Output) system in which different data streams are transmitted from a plurality of transmitting antennas using the same bandwidth and the transmitted data streams are received by a plurality of antennas.

BACKGROUND ART

In MIMO multiplexing transmission, by transmitting different channel-coded data streams from a plurality of transmitting antennas using the same bandwidth, the data rate (i.e., the throughput) can be increased in proportion to the number of transmitting antennas within the given bandwidth. In S-PARC (Selective Per-Antenna Rate Control) employed in such an MIMO system, in addition to controlling the data rate adaptively in accordance with the change in radio wave propagation conditions, control is performed to maintain reception quality by stopping signal transmission from any transmitting antenna for which the received SINR (Signal-to-Interference and Noise power Ratio) has dropped below a predetermined value and by concentrating the transmitter power to the remaining transmitting antennas.

In this case, when the number of antennas used for transmitting the data decrease, the number of channel estimates needed for computation at the receiving end decrease, and as a result, the amount of computation decreases. In other words, the computing resources allocated to the path no longer in use are rendered idle. On the other hand, the channel estimates are periodically calculated from the received data and used for the computation for channel demultiplexing. For example, as described in JP 2001-522166A, if the calculated channel estimates are linearly interpolated to reduce the range of received data to which the same channel estimate is applied, it is possible to quickly cope with fast fading, but this requires a large amount of computing resources.

SUMMARY

According to the present invention, there is provided an MIMO (Multi Input Multi Output) demodulator for performing channel demultiplexing of data transmitted from a plurality of transmitting antennas and received by a plurality of receiving antennas, comprising: a channel estimator calculating a channel estimate based on the received data; a channel estimate adjusting circuit changing, for the channel estimate calculated by the channel estimator, a range of data to which the same channel estimate is to be applied, based on the number of transmitting antennas used for transmitting the data; and an MIMO demultiplexer performing MIMO demultiplexing on the received data by using the channel estimate whose applicable data range has been adjusted by the channel estimate adjusting circuit.

For example, when the number of transmitting antennas is reduced, the channel estimate adjusting circuit reduces the range of data to which the same channel estimate is to be applied.

When the number of transmitting antennas is reduced, the range of data to which the same channel estimate is to be applied is reduced by quickly responding to the change in the propagation environment. Then, by making effective use of the computing resources rendered idle when the propagation environment deteriorates, it is possible to accurately cope with fast fading.

DESCRIPTION OF EMBODIMENTS

The following description is given by taking as an example a case where transmissions from three antennas are stopped in a system that transmits signals from four antennas and receives the signals by four antennas, but generally, the following description is applicable to a case where a transmission or transmissions from selected antenna or antennas are stopped in a system that transmits signals from a plurality of antennas and receives the signals by a plurality of antennas.

Figure 1:
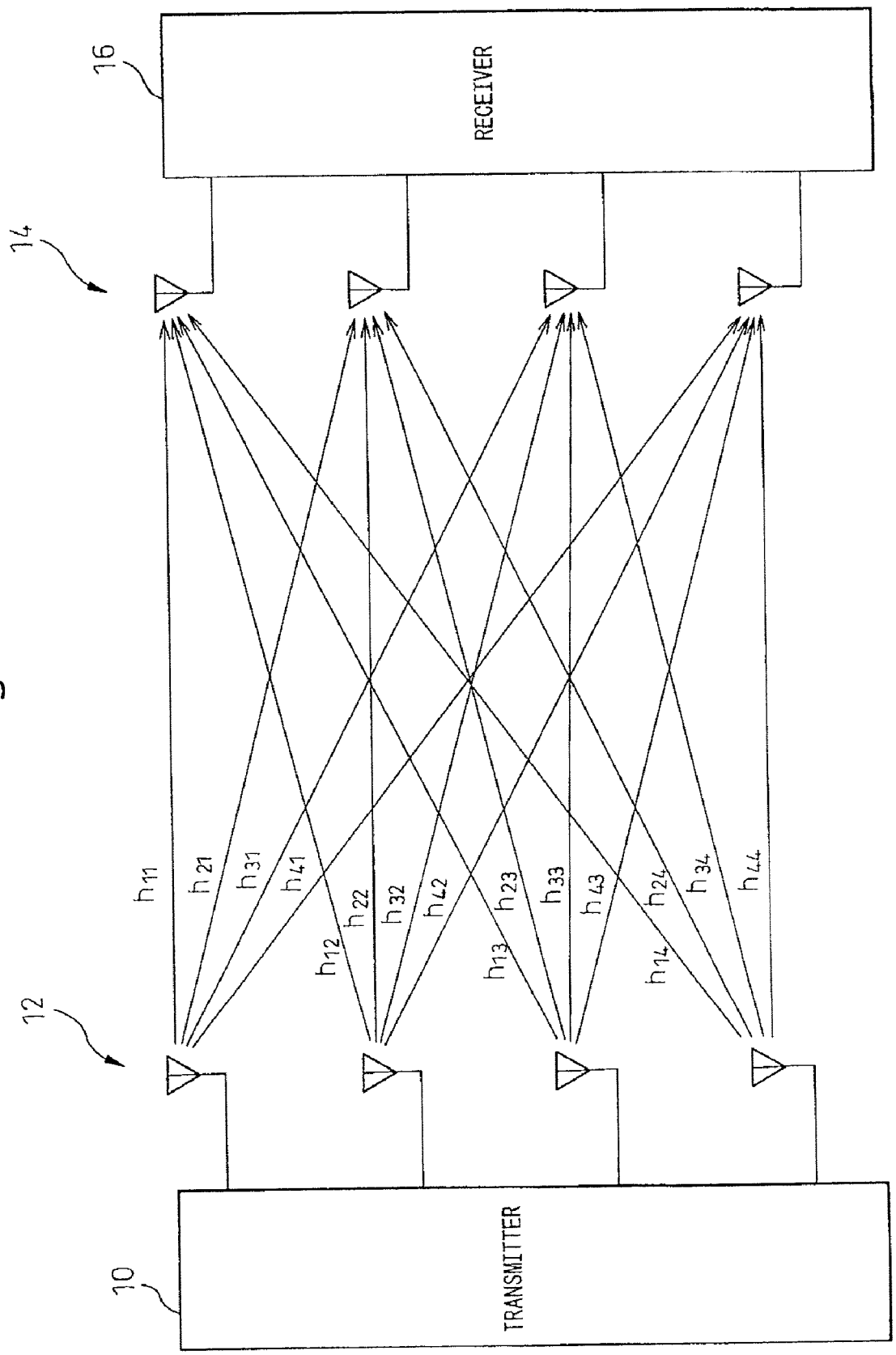
FIG. 1 is a diagram showing one example of an MIMO system.

FIG. 1 shows one example of an MIMO system to which the present invention is applied. A transmitter 10 transmits different channel-coded data streams from four transmitting antennas 12 using the same frequency band. At the receiving end, the data streams are received by four receiving antennas 14; in a receiver 16, channel estimates that can be expressed in the form of a 4×4 matrix, whose elements consist of 16 complex numbers $h_{ij}$ (i, j=1 to 4) as shown in FIG. 1, are calculated by using pilot signals contained in the respective received data streams, and the received data channels are demultiplexed by using the channel estimates, to reconstruct the original data.

Figure 2:
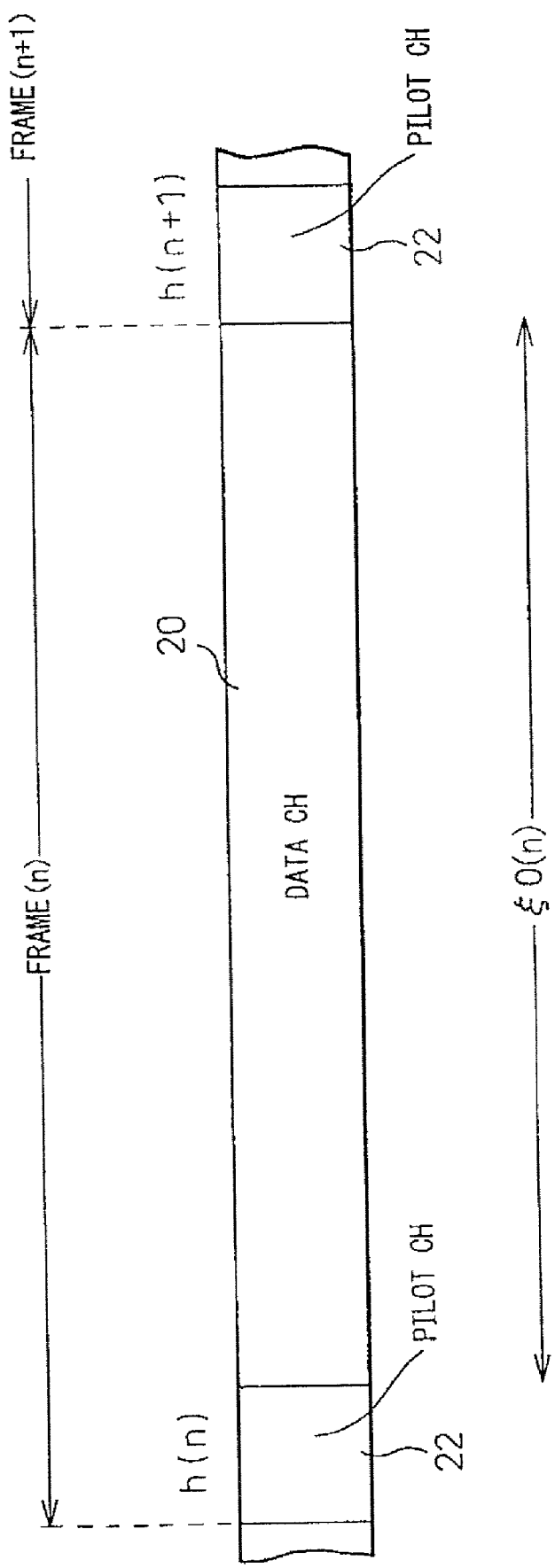
FIG. 2 is a diagram explaining one example of frame format and channel estimate.

FIG. 2 shows one example of the frame format of the data transmitted from the transmitter 10 to the receiver 16. One frame consists of a data channel (CH) 20 and a pilot CH 22 preceding it. In the pilot CH section, the pilot signals comprising mutually orthogonal codes (known patterns) from the respective transmitting antennas are received in multiplexed form by the respective receiving antennas; therefore, by taking correlation with each known pattern for each received signal, the complex number indicating the amplitude and phase of the pilot signal from each transmitting antenna is determined and, by dividing it by a predetermined value, the channel estimate $h_{ij}$ is calculated. Then, an average value $\xi 0(n)$ taken between the channel estimate h(n) determined for the pilot CH in the n-th frame and the channel estimate h(n+1) determined for the pilot CH in the (n+1)th frame is used as the channel estimate $\xi(n)$ that is used for channel demultiplexing of the data CH in the n-th frame (n). Such channel estimates $\xi 0(n)$ also comprise 16 complex numbers $h_{ij}$ (i, j=1 to 4) and can be expressed in the form of a 4×4 matrix having these complex numbers as the elements.

In the receiver 16, computing resources are made available for each frame so that the computation for the channel demultiplexing using the channel estimates ξ0(n) completes within one frame period.

Figure 3:
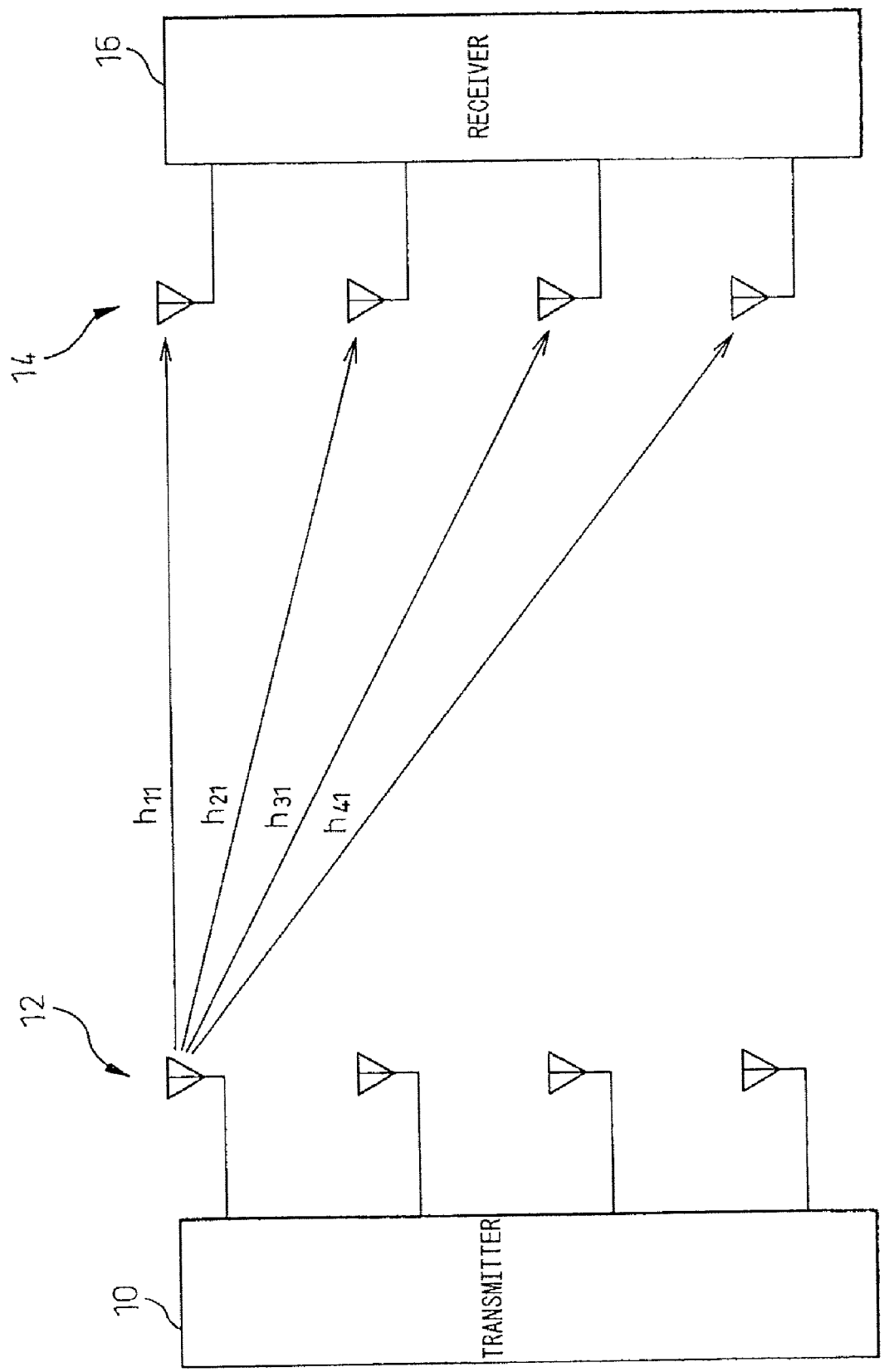
FIG. 3 is a diagram explaining the case where transmissions from some of transmitting antennas are stopped.

Here, if transmissions from three of the four transmitting antennas are stopped due to a degradation in SNIR, as shown in FIG. 3, the channel estimates needed for the computation are only $h_{11}$, $h_{21}$, $h_{31}$, and $h_{41}$, and thus the amount of computation decreases, rendering some of the computing resources idle.

Figure 4:
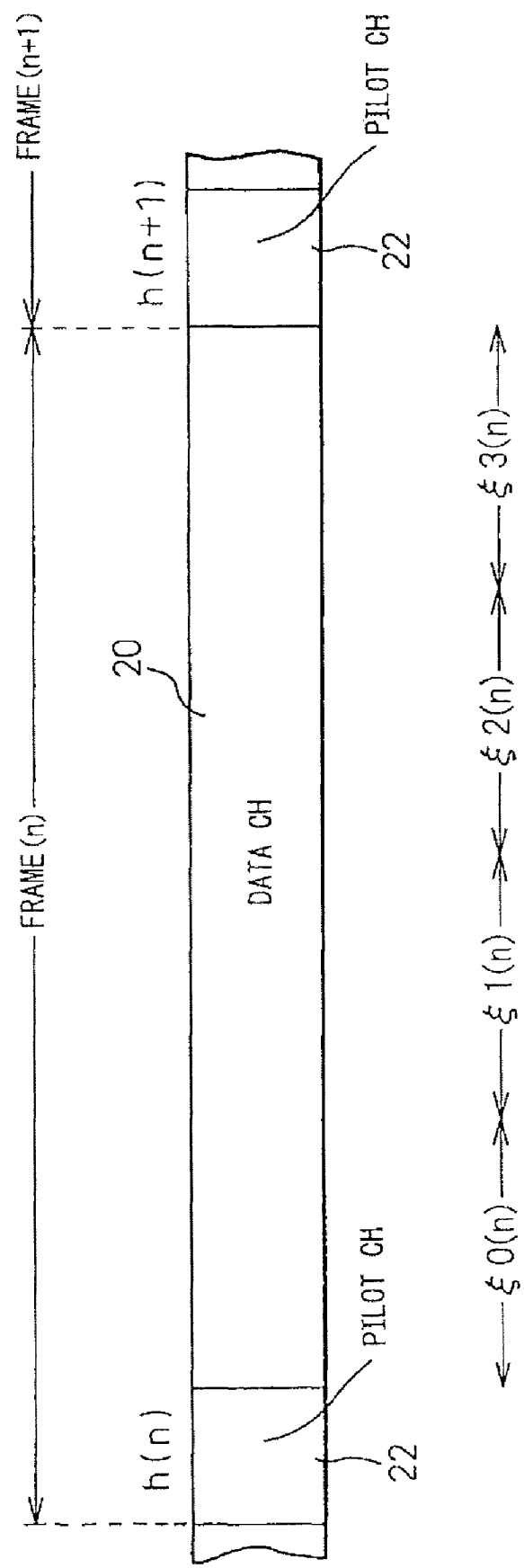
FIG. 4 is a diagram explaining channel estimates for the case where transmissions from some of transmitting antennas are stopped.

In view of this, in the present invention, as shown in FIG. 4, the period of the data CH 20 is divided into four sections, and the computation is performed using four different channel estimates ξ0(n), ξ1(n), ξ2(n), and ξ3(n) calculated for the respective sections by linear interpolation from h(n) and h(n+1). In other words, the data of N symbol intervals within one frame is divided into four parts, and the four different channel estimates are sequentially applied to the respective data of N/4 symbol intervals. This achieves highly accurate computation that can cope with fast fading by making effective use of the computing resources made available as a result of the number of transmitting antennas reduced due to a deterioration of the propagation environment.

Figure 5:
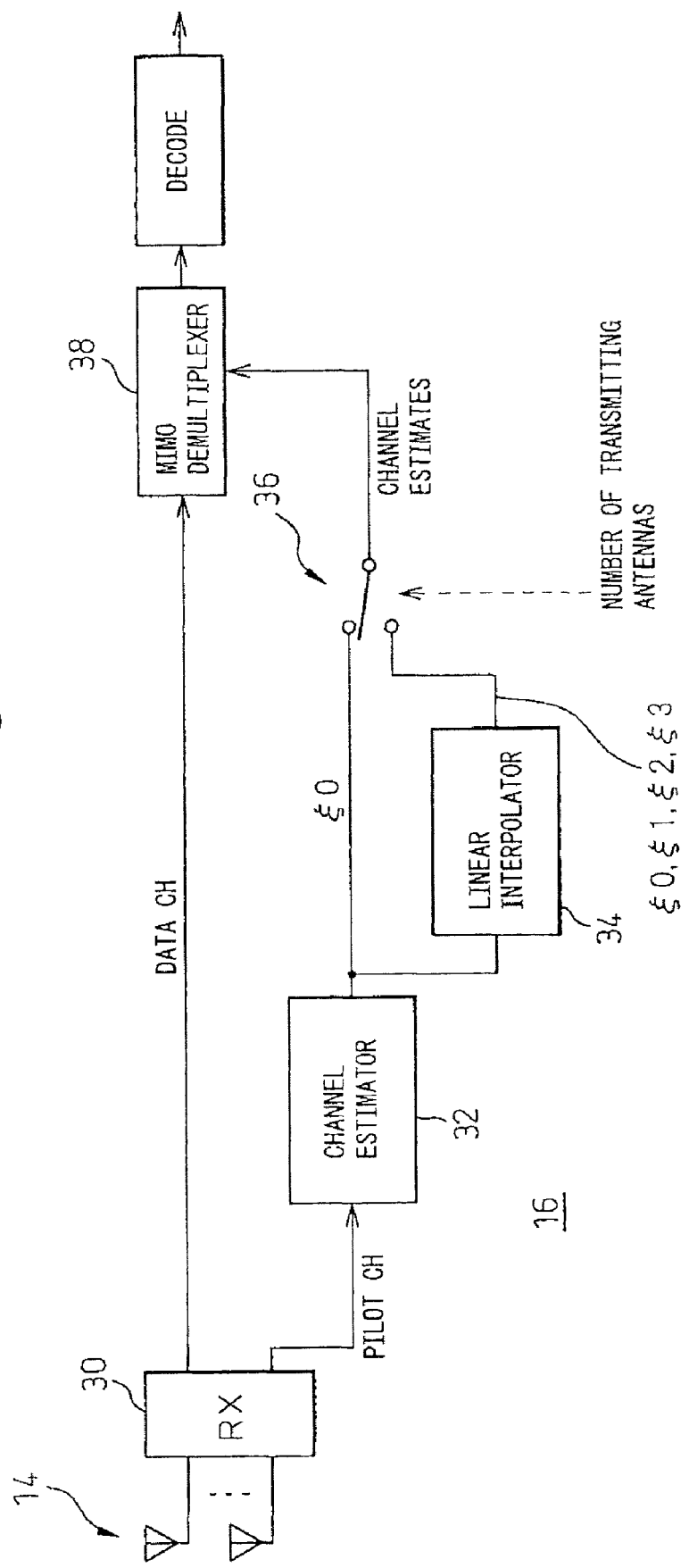
FIG. 5 is a diagram showing the configuration of a receiver according to one embodiment of the present invention.

FIG. 5 shows one configuration example of the receiver 16 that implements the above process. A channel estimator 32 calculates the channel estimate ξ0(n) from the amplitude and phase of the pilot signal contained in the received data in the pilot CH from among the data received by a receiving section 30, and a linear interpolator 34 calculates the channel estimates ξ0(n), ξ1(n), ξ2(n), and ξ3(n) by linear interpolation. A channel estimate selector 36 selects the channel estimates ξ0(n), ξ1(n), ξ2(n), and ξ3(n) obtained by linear interpolation from adjacent channel estimates when the number of transmitting antennas is reduced to one, or otherwise selects the channel estimate ξ0(n) obtained by taking an average between the adjacent channel estimates, and supplies the selected channel estimates to an MIMO demultiplexer 38. Using the channel estimates selected by the channel estimate selector 36, the MIMO demultiplexer 38 performs the channel demultiplexing by applying a demultiplexing algorithm, such as an MMSE (Minimum Mean Square Error) algorithm or an MLD (Maximum Likelihood Detection) algorithm, to the received data in the data CH period.

As the number of transmitting antennas that is used by the channel estimate selector 36, use may be made of the number of transmitting antennas that is transmitted from the transmitting end over the control channel, or alternatively, the number of pilot signals detected by the channel estimator 32 as having correlation greater than a threshold value with a known pattern may be used as the number of transmitting antennas.

The invention claimed is:

1. An MIMO (Multiple Input Multiple Output) receiver for performing channel demultiplexing of data transmitted from a plurality of transmitting antennas and received by a plurality of receiving antennas, comprising:

a channel estimator configured to calculate a channel estimate based on the received data;

a linear interpolator configured to calculate a plurality of different channel estimates by using the channel estimate output from the channel estimator;

a switch configured to select either the channel estimate within a frame from the channel estimator or the different channel estimates within a frame from the linear interpolator based on the number of the plurality of transmitting antennas; and a MIMO demultiplexer configured to perform a MIMO demultiplexing on the received data by using either the channel estimate from the channel estimator or the different channel estimates from the linear interpolator whose applicable data range has been adjusted by both the linear interpolator and the switch.

2. An MIMO receiver according to claim 1, wherein when the number of the plurality of transmitting antennas is reduced, the range of data to be applied is reduced by both the linear interpolator and the switch.

3. An MIMO receiver according to claim 2, wherein the range of data to be applied is reduced, by linearly interpolating, at the linear interpolator, between channel estimates calculated by the channel estimator.

4. An MIMO receiver according to claim 3, wherein the switch is operative to select either the channel estimate output from the channel estimator or the different channel estimates output from the linear interpolator, depending on the number of the plurality of transmitting antennas and supply either the selected channel estimate or the selected different channel estimates to the MIMO demultiplexer.

5. An MIMO (Multiple Input Multiple Output) reception method for performing channel demultiplexing of data transmitted from a plurality of transmitting antennas and received by a plurality of receiving antennas, comprising:

calculating a channel estimate based on the received data;

calculating a plurality of different channel estimates by using the calculated channel estimate based on the received data by a linear interpolator;

selecting either the calculated channel estimate within a frame or the calculated different channel estimates within a frame by the linear interpolator, depending on the number of the plurality of transmitting antennas; and performing a MIMO demultiplexing on the received data by using either the channel calculated estimate from the channel estimator or the calculated different channel estimates from the linear interpolator whose applicable data range has been adjusted by the selecting.

* * * * *